United States Patent Office

3,798,126
Patented Mar. 19, 1974

3,798,126
FISH PROTEIN ISOLATE
Rupert Josef Gasser, Kempttal, Grafstal, and Lienhard Bodo Huster, Winterthur, Switzerland, assignors to Societe d'Assistance Technique pour Produits Nestle S.A., Lausanne, Switzerland
No Drawing. Filed Sept. 10, 1971, Ser. No. 179,586
Claims priority, application Great Britain, Sept. 23, 1970, 45,311/70
Int. Cl. C12b 1/00
U.S. Cl. 195—5
19 Claims

ABSTRACT OF THE DISCLOSURE

Protein is isolated from fish material (e.g. fish meal, raw fish, fish offal) by solubilization with alkali and the lipids present in the fish are removed by liquid-liquid extraction with one or more solvents.

---

This invention is concerned with the production of a fish protein isolate.

The object of the invention is to provide a process for preparing a high-grade protein from fish and fish residues, the protein being in the form of a soluble white powder which is bland in odor and flavor.

According to the invention, protein is isolated from fish material (including fresh fish, fish meal and fish offal) by a process which comprises treating the fish with alkali in an aqueous medium at a temperature of 90 to 120° C. for not more than about five minutes, the alkali concentration in the medium being between 0.02 and 0.5 N whereby a substantial portion of the protein present in the fish is solubilized, adjusting the pH value of the medium to a value of about 7 to 10, removing insoluble matter from the medium, removing the lipids present by liquid-liquid extraction with a solvent for the lipids and recovering the protein from the solution.

The term "lipids" as used herein designates not only fats but also lipoproteins, phospholipids and like substances.

The procedure which has been outlined comprises a number of operations each of which contributes to the desirable properties of the final product. Of particular significance is the initial treatment with alkali, which causes solubilization of the protein. This treatment is preferably effected with intense mechanical disintegration at a relatively high temperature in the presence of alkali in sufficient concentration for solubilization, but for a very short period of time to avoid damage to the protein. After the first alkali treatment and prior to separation of insolubles the pH is adjusted to a value of about 7 to 10. This may be effected by adding an acid (sulphuric, hydrochloric) or by injecting gaseous sulphur dioxide. After pH adjustment substantially all the protein remains in solution, so that the insoluble non-protein matter such as bones, scales and the like may easily be removed, preferably by centrifugation.

If the fish starting material is a fish meal (which may be partly defatted), it is preferably suspended in water to provide a slurry containing about 5 to 15% by weight of dry matter. Fresh fish or fish offal has a relatively high water content, so that water need only be added if the solids level is outside the limits indicated.

After removal of insolubles, the protein may be separated from the solution, for example by precipitation at pH 4.5 to 6.0. Precipitated protein, with which most of the lipids are associated, may be separated by centrifugation, and it is usually desirable to wash it with water or sodium chloride solution. Generally, the quantity of wash liquor will be between about 2 and 6 times the weight of protein. The washing operation may be repeated several times and the wash liquor may be recovered for addition, after desalting, to fish meal. After washing, the protein is redissolved in alkali, preferably under conditions similar to those applied in the first treatment.

Before extraction of the lipids, the dissolved protein may be subjected to mild hydrolysis with a proteolytic enzyme, desirably at a pH of 7 to 10. The pH will preferably have been adjusted to 7 to 8 after the alkali treatment, and the enzyme used should be active at alkaline pH. Papain is the preferred enzyme, with which hydrolysis may be effected at a temperature of 60 to 80° C. during 5 to 30 minutes. The hydrolysis temperature will normally be adjusted having regard to the requirements of the enzyme used.

After hydrolysis the enzyme is inactivated by heating and the solution cooled to ambient temperature. Thereafter, insoluble matter is removed (e.g. by centrifugation) and the lipids present extracted with a solvent. This operation may be carried out in continuous manner, using a centrifugal extractor or any suitable extraction column, with a water-immiscible solvent or a solvent system comprising at least one such solvent. The term "water-immiscible" is used in its usual technological sense, and hence includes solvents which are miscible with water to a slight degree as well as solvents which are water-immiscible. Care should be taken to avoid formation of an emulsion and it is preferred to use a solvent system comprising as primary solvent a water-miscible polar solvent for the lipids, such as ethanol or isopropanol, together with a secondary solvent, less polar than the primary, for example methyl isobutyl ketone or hexane. Preferred solvent combinations are isopropanol/methyl isobutyl ketone, ethanol/methyl isobutyl ketone and isopropanol/hexane. The ratio of primary to secondary solvent may be between 1:1 and 1:2.5 on a volume basis. The proportion of protein solution to total solvent will generally be 60 to 80 parts solution (containing 3.5 to 10.5% by weight dissolved protein) to 20 to 40 parts of solvent. The solvent and extracted lipids may be recovered by conventional techniques, and solvent residues are preferably removed from the protein solution by rectification or steam stripping.

The solvent-free protein solution is preferably concentrated to about 10 to 20% solids and acidified to pH 4.5 to 5.5 (e.g. with hydrochloric acid) to precipitate an undesirable, dark colored protein fraction having a fishy taste. The precipitated fraction may be removed by centrifugation whereas the purified protein is decolourized and desalted prior to drying. Active charcoal is preferably used for decolorization, and desalting may be effected by ion-exchange or ultrafiltration. Before drying the protein solution may be further concentrated, to about 30 to 50% by weight solids, for example by reverse osmosis or other techniques which avoid heat damage of the protein. The dry product is a white powder, soluble in water, and having a bland taste. The protein content lies between 95 and 100% by weight.

The invention is illustrated by the following examples in which the parts and percentages are by weight.

EXAMPLE 1

An aqueous slurry containing 10% of non-extracted grade fishmeal is heated to 70° C. and sufficient sodium hydroxide solution is added to provide an alkali concentration of 0.3 N. The alkaline slurry is rapidly heated to 100 to 120° C. in a continuous stream by steam injection. The flow is adjusted to give a holding time of about 30 seconds prior to cooling to 65° C.

After cooling the pH is adjusted to about 8 by injection of gaseous sulphur dioxide and the slurry is further cooled to ambient temperature.

Insoluble matter present in the slurry, such as fish bones, is removed by centrifugation and a clear protein solution containing about 11% solids is recovered. This solution is acidified to pH 5.2 by addition of sulphur dioxide and the resulting precipitate is separated by centrifugation.

The mother liquor is desalted and dried for incorporation in feed grade fish meal. The crude protein precipitate is washed three times with water (or 10% sodium chloride solution), at a rate of 4 parts of wash liquor for each part of protein.

After washing the protein is suspended in water and dissolved by adding alkali to a concentration of 0.2 N. The solution is heated rapidly to 100° C., held for 30 seconds, and cooled to 60° C. The pH of the solution is adjusted to 7.5, 2% of papain, on protein basis, added and the temperature is maintained at 60° C. for 10 minutes. The enzyme is then inactivated by heating for 3 minutes at about 100° C. and the solution is cooled to ambient temperature.

Insoluble matter is removed by centrifugation and the protein solution, after mixing with 17% of isopropanol, is defatted in a centrifugal extractor to which methyl isobutyl ketone is supplied at a rate of 1 part per 4 parts of protein solution containing about 7% solids.

The solvent stream leaving the extractor, containing fats, phospholipids, lipoproteins and like substances is processed for recovery of solvent and lipid fraction whereas the protein solution is stream stripped to remove solvent residues and concentrated to 15% solids. The pH of the concentrated solution is adjusted to 5.0 with hydrochloric acid, which causes the precipitation of a small amount of an undesirable protein fraction which is removed by centrifugation. The clear solution from the centrifuge is decolorized with active charcoal and desalted by ion-exchange treatment using a strongly basic and a strongly acidic resin. After concentration (reverse osmosis) to 30% solids the protein solution is spray-dried at a product temperature not exceeding 80°C.

The resulting dry powder is substantially completely soluble in water and has a bland taste. The protein content is 99% and the product may be incorporated in various foods and beverages. It may also be shaped, by extrusion or spinning.

EXAMPLE 2

An aqueous slurry containing 25% fish filleting waste is prepared and its pH is adjusted to 9 by addition of 30% sodium hydroxide solution. The slurry is vigorously stirred for one hour and thereafter heated to 100° C. by steam injection after adjustment of the alkali concentration to 0.04 N by addition of 30% NaOH.

The heating is carried out in a continuous system, the flow rate being adjusted to give a holding time of about 2 minutes at 100° C. prior to cooling to 60° C. After cooling the pH is adjusted to 7.5 by addition of N-hydrochloric acid and the insoluble matter, together with a fatty phase, removed by centrifugation. A clear solution containing 4% of protein is thus obtained.

1% of papain, on protein basis, is added to the solution, the temperature is maintained for 30 minutes at 65° C. and then the enzyme is inactivated by heating at about 100° C. for 3 minutes. After cooling to ambient temperature, insoluble matter precipitated during the enzyme treatment is removed by centrifugation and the protein solution concentrated to 10% dry matter by reverse osmosis.

The concentrated solution is mixed with 17% of isopropanol, and the lipids are extracted in a centrifugal extractor to which methyl isobutyl ketone is fed at a rate of 1 part per 4 parts of protein/isopropanol solution. The exiting solvent stream is treated for recovery of solvent and lipids whereas the protein solution is rectified for removal of solvent traces.

The protein solution is then treated with active charcoal and desalted and concentrated to 30% solids by ultrafiltration. It may be spray- or freeze-dried, in the former case preferably at a product temperature not exceeding 80° C.

A white, water-soluble powder, having a bland taste and containing 95% protein is thus obtained. It is suitable for incorporation in various foods and beverages, and it may also be shaped by extrusion or spinning.

EXAMPLE 3

An aqueous slurry containing 10% of partially defatted grade fishmeal is heated to 70° C. and sufficient potassium hydroxide solution is added to provide an alkali concentration of 0.3 N. The alkaline slurry is rapidly heated to 100° C. in a continuous stream by steam injection. The flow is adjusted to give a holding time of about 30 seconds prior to cooling to 65° C.

After cooling the pH is adjusted to about 8 by addition of N-hydrochloric acid and the slurry is further cooled to ambient temperature.

Insoluble matter present in the slurry, such as fish bones, is removed by centrifugation and a clear protein solution containing about 11% solids is recovered. This solution is acidified to pH 5.2 by addition of N-hydrochloric acid and the resulting precipitate is separated by centrifugation.

The mother liquor is desalted and dried for incorporation in feed grade fish meal. The crude protein precipitate is washed three times with 10% sodium chloride solution, at a rate of 4 parts of wash liquor for each part of protein.

After washing the protein is suspended in water and dissolved by adding alkali to a concentration of 0.1 N. The solution is heated rapidly to 100° C., held for 30 seconds and cooled to 60° C. The pH of the solution is adjusted to 7.5, 2% of papain, on protein basis, added and the temperature is maintained at 60° C. for 10 minutes. The enzyme is then inactivated by heating for 3 minutes at about 100° C. and the solution is cooled to ambient temperature.

Insoluble matter formed during the enzyme treatment is removed by centrifugation and the protein solution, after mixing with 17% of isopropanol, is defatted in a centrifugal extractor to which methyl isobutyl ketone is supplied at a rate of 1 part per 4 parts of protein solution containing about 7% solids.

The solvent stream leaving the extractor, containing fats, phospholipids, lipoproteins and like substances is processed for recovery of solvent and lipid fraction whereas the protein solution is steam stripped to remove solvent residues and concentrated to 15% solids. The pH of the concentrated solution is adjusted to 5.0 with hydrochloric acid, which causes the precipitation of a small amount of an undesirable protein fraction which is removed by centrifugation. The clear solution from the centrifuge is decolorized with active charcoal and desalted by ultrafiltration. After concentration (reverse osmosis) to 30% solids the protein solution is freeze-dried.

The resulting dry powder is substantially completely soluble in water and has a bland taste. The protein content is 99% and the product may be incorporated in various foods and beverages. It may also be shaped, by extrusion or spinning.

We claim:
1. A process for isolating protein from fish material which comprises:
   (a) solubilizing a substantial portion of the protein of the fish material by slurrying said material for not more than about 5 minutes in an aqueous medium at a temperature of from 90° to 120° C., said medium having an alkali concentration of between 0.02 and 0.5 N;
   (b) adjusting the pH medium to a value of about 7 to 10;
   (c) removing insoluble matter from the aqueous medium;
   (d) removing lipids present in the aqueous medium through liquid-liquid extraction with a solvent for said lipids, said solvent comprising an essentially water-immiscible liquid; and (e) recovering protein from the aqueous medium.

2. A process according to claim 1 wherein the slurry of step (a) comprises 5 to 15% by weight of dry matter of fish material.

3. A process according to claim 1 in which the aqueous medium produced by step (c) is adjusted to a pH of about 4.5 to 6.0 in order to precipitate protein which is first washed and then redissolved in an aqueous alkali medium prior to the extraction of step (d).

4. A process according to claim 3 in which the precipitated protein is redissolved in an aqueous alkali medium having a concentration of 0.02 to 0.5 N.

5. A process according to claim 3 in which the precipitated protein is redissolved in an aqueous alkali medium at a temperature of 90 to 120° C. for not more than about 5 minutes.

6. A process according to claim 1 in which, prior to step (d), the solubilized protein in the aqueous medium is subjected to mild hydrolysis through treatment with a proteolytic enzyme at a pH of 7 to 10 and a temperature of 60° to 80° C.

7. A process according to claim 6 in which the enzyme is papain.

8. A process according to claim 6 in which, after treatment with an enzyme, insoluble material formed during said treatment is removed.

9. A process according to claim 1 in which the solvent of step (d) comprises both a water-miscible solvent and an essentially water-immiscible solvent.

10. A process according to claim 9 in which the water-miscible solvent comprises isopropanol.

11. A process according to claim 9 in which the essentially water-immiscible solvent comprises methyl isobutyl ketone.

12. A process according to claim 9, in which the water-miscible and essentially water-immiscible solvents are in a ratio of between 1:1 and 1:2.5 on a volume basis.

13. A process according to claim 1 in which 20 to 40 parts of solvent per 60 to 80 parts of aqueous medium are employed in the extraction of step (d).

14. A process according to claim 9 in which 20 to 40 parts of solvent per 60 to 80 parts of the aqueous medium are employed in the extraction of step (d).

15. A process according to claim 1 in which the pH of the extracted aqueous medium of step (d) is acidified to 4.5 to 5.5 and the resulting precipitate removed from the remaining aqueous protein-containing medium.

16. A process according to claim 15 in which, prior to acidification, the extracted aqueous medium of step (d) is concentrated to about 10 to 20% by weight of protein solids.

17. A process according to claim 16 in which, following removal of the precipitate, the aqueous medium is concentrated to yield a protein isolate.

18. A process according to claim 1, in which the aqueous medium of step (d) is at ambient temperature prior to liquid-liquid extraction.

19. A process according to claim 8, in which the aqueous medium is cooled to ambient temperature after treatment with an enzyme.

References Cited
UNITED STATES PATENTS

| | | | |
|---|---|---|---|
| 2,416,196 | 2/1947 | Mortenson | 260—412.8 |
| 3,561,973 | 2/1971 | Rutman | 99—18 |
| 3,649,294 | 3/1972 | Thijssen | 260—112 |
| 2,686,126 | 8/1954 | Lovern et al. | 99—18 X |
| 2,602,031 | 7/1952 | Ugelstad | 260—112 R |
| 2,875,061 | 2/1959 | Vogel et al. | 99—18 X |

A. LOUIS MONACELL, Primary Examiner

R. B. PENLAND, Assistant Examiner

U.S. Cl. X.R.

426—364; 260—112 R